(12) United States Patent
Doe et al.

(10) Patent No.: US 7,043,643 B1
(45) Date of Patent: May 9, 2006

(54) METHOD AND APPARATUS FOR OPERATING A COMPUTER IN A SECURE MODE

(75) Inventors: Kin Doe, Union City, CA (US); Leigh Perona, Fremont, CA (US); Francis L. Nguyen, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 802 days.

(21) Appl. No.: 10/006,049

(22) Filed: Dec. 6, 2001

(51) Int. Cl.
*H04L 9/32* (2006.01)
*H04L 9/00* (2006.01)
*H04K 1/00* (2006.01)
*G06F 17/30* (2006.01)
*G06F 7/04* (2006.01)

(52) U.S. Cl. .................. 713/189; 713/186; 726/27; 726/28

(58) Field of Classification Search ............ 713/186
See application file for complete search history.

(56) References Cited

U.S. PATENT DOCUMENTS

| | | | | |
|---|---|---|---|---|
| 5,728,998 | A | * | 3/1998 | Novis et al. ............... 235/380 |
| 5,815,577 | A | * | 9/1998 | Clark ......................... 380/52 |
| 6,088,450 | A | * | 7/2000 | Davis et al. ............... 713/182 |
| 6,351,817 | B1 | * | 2/2002 | Flyntz ........................ 713/202 |

OTHER PUBLICATIONS

Corcoran, David, Muscle Flexes Smart Cards into Linux, http://delivery.acm.org/10.1145/330000/328471/a8-corcoran.html?key1=328471&key2=6002246111&coll=ACM&dl=ACM&CFID=45196714&CFTOKEN=1379804.*

Net Warrior, Great Downloads, http://netwarrior.8m.com/utilities.htm.*

* cited by examiner

*Primary Examiner*—Thomas R. Peeso
*Assistant Examiner*—Kristin Derwich
(74) *Attorney, Agent, or Firm*—Martine Penilla & Gencarella, LLP

(57) ABSTRACT

A method for activating an encryption control device that is in communication with a computer for providing a secure computing environment for a user is provided. The method initiates with providing a card for insertion into a card reader of the encryption control device. The card is configured to receive and pass data. Next, a biometric identifier is received from the user. The biometric identifier enables validation of the user as the authorized owner of the card. Then, a challenge/response protocol between the encryption control and the inserted card is run. The challenge/response protocol establishes that the card and the encryption control device are compatible. Next, an encryption engine of the encryption control device is activated to create a secure computing environment if the user is validated as the authorized owner of the card and the challenge/response protocol is successfully executed.

19 Claims, 8 Drawing Sheets

METHOD AND APPARATUS FOR OPERATING A COMPUTER IN A SECURE MODE

CROSS REFERENCE TO RELATED APPLICATIONS

This application is related to U.S. patent application Ser. No. 10/006,308, filed on the same day as the instant application and entitled "METHOD AND APPARATUS FOR A SECURE COMPUTING ENVIRONMENT." This application is hereby incorporated by reference.

BACKGROUND OF THE INVENTION

1. Field of the Invention

This invention relates generally to methods and apparatus for securing personal computer data and more specifically to providing a portable encryption/decryption device that is configured to quickly and conveniently interface with any computer.

2. Description of the Related Art

The phenomenal growth of personal computers (PC) in the world over the recent past has fueled a technological revolution of dramatic proportions. Personal computers pervade not only the workplace, but also the home. In fact, the PC is approaching a point where it is a commodity similar to a telephone. The ubiquitous nature of the PC in the world today is partially due to the many functions the PC is capable of performing, especially in lieu of the worldwide hysteria created by the Internet.

Personal computers are now routinely utilized to transfer sensitive data over the Internet via local area networks (LAN) and wide area networks (WAN). Additionally, numerous households keep financial data and other personal information on a PC. Many of the same households communicate personal information over the Internet through e-commerce channels. Because of the efficiencies related to electronic commerce, more and more businesses and consumers are moving a higher percentage of their transactions to this medium over time. With the advent of digital signatures, transactions via a personal computer are becoming routine.

However, with all of the promotion centered around the technological revolution there is a downside. Given the sensitive nature of the information stored within a PC, whether at work or at home, the risk of someone stealing this sensitive information, or simply using someone's PC to impersonate them, is substantial. For example, anyone can commandeer a party's work PC when the party is out of the office or just at lunch. Access to the party's work PC can cause damage ranging from pilfering confidential information to sending out emails from the PC with the receiving parties believing the message is being originated by the owner of the email address. An outside hacker may be able to gain access to data stored on a PC's hard drive or the server system to which the PC is connected to copy or compromise the data. Furthermore, with the large population of work and residential PC's being always connected to the Internet via cable modems or direct subscriber lines (DSL), a hacker may gain access to the PC over a network to which the cable modem or DSL is connected.

Current PC's are also woefully inadequate in providing a safe environment for creating and saving documents or data. Not surprisingly, there is a valid concern over the level of the protection of sensitive data as it is vulnerable to a host of criminal or suspect activity such as industrial espionage, fraud and the like. Furthermore, when transporting sensitive or personal data via a compact disc, hard drive, floppy or some other storage media, the data is at risk of falling into a competitor's hands or even some other adversarial party through theft or loss.

One attempt to prevent the data from becoming susceptible, is to apply passwords in order to protect access to sensitive data. For example, screen savers provide the option of password protection. In addition, attaining access to secure websites generally requires disclosing a password as a prerequisite. However, passwords may be stolen through commonly known means or through hacker programs which monitor key stroke activity and thus allow access to data supposedly protected.

Software applications currently exist which locally encrypt data prior to transmitting, such as PGP™. However, if a user wants to copy the data onto a storage medium for use on another PC, there are no quick and convenient solutions available. Moreover, these software applications which locally encrypt data are typically slow.

With modern society becoming more connected, more information is becoming available. Additionally, in order to focus on core activities organizations are offloading the management and storage of sensitive data to third party contractors such as storage service providers. Thus, there is a contemporaneous need to provide safeguards for data integrity and data secrecy. Likewise, the source of the information or data must be authenticated so that the recipient has complete certainty that the information came from the original source in its original state. While data encryption methodology such as data encryption standard (DES) and triple DES provide protection of sensitive data, they lack means to validate that the information or data such as electronic mail, attachments, credit card accounts, website login passwords and so forth, is actually coming from the source identified as the sender.

Simply encrypting the above mentioned data is further restrictive in that there does not exist any convenient manner to handle the portability of the data while maintaining the integrity and security of the data. For example, the data may reside or be transferred to a portable storage media such as a compact disk or floppy disk. If the data, either in encrypted or plain text form, is transported to another PC, then there does not exist a convenient process to manipulate or send the data and simultaneously safeguard data integrity and data security.

As a result, there is a need to solve the problems of the prior art to provide a convenient and portable solution to secure sensitive data and authenticate data integrity thereby validating the source and state of the data.

SUMMARY OF THE INVENTION

Broadly speaking, the present invention fills these needs by providing a method which conveniently establishes a secure computing environment. It should be appreciated that the present invention can be implemented in numerous ways, including as a process, an apparatus, a system, or a device. Several inventive embodiments of the present invention are described below.

In one embodiment, a method for providing a secure computing environment is furnished. The method initiates with providing an encryption control device in communication with a computer and a smart card. Next, a user is authenticated as a valid owner of the smart card. Then, the encryption control device is initialized through a challenge/response protocol with the smart card if the valid owner is authenticated. Next, an encryption/decryption engine of the encryption control device is activated to enable access to data in a secure computing environment if the challenge response protocol is executed successfully.

In another embodiment, a method for activating an encryption control device that is in communication with a computer for providing a secure computing environment for a user is provided. The method initiates with providing a card for insertion into a card reader of the encryption control device. The card is configured to receive and pass data. Next, a biometric identifier is received from the user. The biometric identifier enables validation of the user as the authorized owner of the card. Then, a challenge/response protocol between the encryption control and the inserted card is run. The challenge/response protocol establishes that the card and the encryption control device are compatible. Next, an encryption engine of the encryption control device is activated to create a secure computing environment if the user is validated as the authorized owner of the card and the challenge/response protocol is successfully executed.

In yet another embodiment, a method for operating a computer in a secure mode is provided. The method initiates with providing an encryption control device which is in communication with the computer and a smart card. The encryption control device stores a biometric identifier of a user. Next, the user is authenticated as a valid owner of the smart card. Authenticating the user includes receiving a biometric indicator from the user and comparing the received biometric indicator with the stored biometric indicator for a match. Then, an encryption engine of the encryption control device is activated to create a secure operating mode if the user is authenticated.

The advantages of the present invention are numerous. Most notably, the method allows for quick and convenient encryption protection of sensitive data. In addition, the device and its associated software and drivers allows for easy connection of secure and non-secure devices behind it. Furthermore, numerous security features are provided so that a user may customize the level of security desired.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
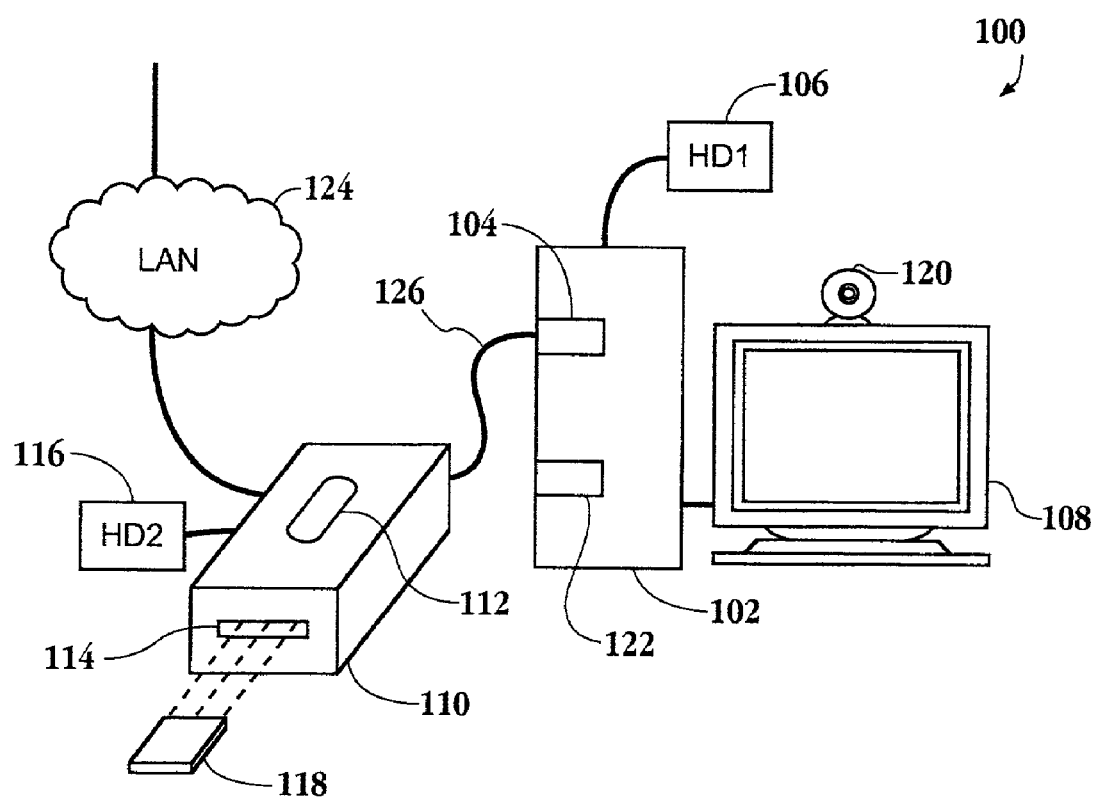
FIG. 1 illustrates a block diagram defining a portable device for creating a secure environment in accordance with one embodiment of the invention.

An invention is described for an apparatus and method for providing a secure environment for operating a personal computer. It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for authenticating and validating a user's identity to allow access to encrypted data. The invention provides an encryption control device easily connected to any computer. The encryption control device and its associated software and drivers allow for convenient connection of secure and non-secure devices behind it, such as a hard drive. Authentication and validation of a user are required to unlock the encryption control device in order for the user to gain access to the encryption/decryption functionality and transfer, create, modify or copy encrypted data.

In one embodiment of the invention, the encryption control device is a hub containing a triple data encryption standard (DES) high-speed ciphering engine in addition to a RSA cryptographic processor and random number generator, a user authentication device, such as a biometric scanner, and a card reader. The DES ciphering engine is capable of handing data rates at a minimum of 50 Mbytes per second. The data encryption engine is unlocked to allow a user access to encrypted data only after the user has been authenticated. The authentication process is a two step process where the user is linked to a card and then the encryption control device is linked to the card. First, the user inserts the card into the card reader of the encryption control device. The user then completes the first step of the process by providing a personal identifier to validate that the user is the owner of the card. In accordance with a preferred embodiment of the invention, the personal identifier may be in the form of a biometric identifier such as a fingerprint, facial recognition, iris scan, and the like. In another embodiment, a personal identification number (PIN) may be the personal identifier. Upon successful completion of the first step, a challenge/response protocol is then completed between the card microprocessor and the hub microprocessor. The protocol initiates with a public key being sent from the hub microprocessor through a card reader to the card inserted in the card reader. The card in turn, sends a public key to the encryption control device of the hub. The encryption control device then sends its private key encrypted with its public key to the inserted card. Upon receipt of the private key from the encryption control device, the card sends its private key to the encryption control device encrypted with the encryption control device's private key. In a preferred environment the card is a smart card.

It should be appreciated that while the authentication process described above made reference to a personalized smart card containing information about the user, a personal identification number may replace the smart card. It should be appreciated that the level of security provided by a PIN is not as protective as the smart card embodiment.

With the completion of the above described challenge/response protocol a secure path is now established and the smart card will allow its memory to be written with the configuration and biometric data from the encryption control device under the command of a device driver. The encryption control device unlocks the data path to the card and indicates the card is ready to be written. A software driver then downloads and verifies the configuration contents of the card. The encryption control device under direction from the software driver appends and stores the biometric data to the card. At this point the system is fully configured and the user's identification has been initialized.

It should be appreciated that the above described initialization process is only performed upon the initial installation of the hub in accordance with one embodiment of the invention. Therefore, after initial installation the normal use and control of the device is enabled via a user's system tray utility in accordance with one embodiment of the invention. For example, after the initialization has been completed, the user may only be required to insert his card into the card reader of the hub and submit a biometric, i.e. fingerprint, iris scan, facial recognition, etc., to unlock the encryption control device to allow for the transfer, creation or copying of encrypted/decrypted data. It should be appreciated that once the data encryption engine is unlocked any devices connected behind it on secure ports will appear and the associated drivers will be installed and enabled. It should be further appreciated that removal of the card from the card reader automatically locks the encryption/decryption engine in one embodiment of the invention. In one embodiment, the smart card interface with the hub may be wireless using similar technology as access card key that works in close proximities. The wireless technology makes it more difficult to leave the smart card behind by mistake. Simultaneously, a driver may report the device is no longer available to the system, thereby displaying a warning regarding data corruption and the need for an orderly shutdown procedure.

In addition, the system/hub/driver may accommodate several secure users in one embodiment. Here the users may be sharing a single card or unique cards holding the same secret key. Thus the users will be enabled to collaborate on a shared document within the same secure environment. In another embodiment, the computer desktop and environment will configure at the change of the card and validation of the user.

Described below are various hardware and software illustrations for creating a secure environment to operate a personal computer. It should be appreciated that the hardware and software implementations are provided for illustration purposes only and are not meant to limit the invention.

FIG. 1 illustrates block diagram 100 defining a portable device for creating a secure environment in accordance with one embodiment of the invention. Block diagram 100 displays a computer 102 containing a central processing unit (not shown). The computer tower 102 contains a universal serial bus (USB) controller 104 and a network interface card (NIC) 122 with each providing a connection for peripheral devices. In another embodiment, port 104 is a FIREWIRE or USB interface. A hard drive (HD1) 106 is attached to computer 102. For illustration purposes, the hard drive 106 is shown separate from computer 102, however HD1 106 may be contained within computer 102. Connected to computer 102 is monitor 108.

Continuing with FIG. 1, the encryption control device 110 (also referred to as the hub) is connected to computer 102. In accordance with one embodiment of the invention, the encryption control device 110 is connected to the computer 102 via a FIREWIRE™ 1394 or USB cable connecting to port 104 of computer 102 and a port (not shown) of the encryption control device 110. It should be appreciated that the use of a USB or a FIREWIRE™ interface allows for "hot plug" installation of a hub 110 to a computer system, thereby avoiding the need to power off the system. In an alternative embodiment, the hub 110 may be connected to computer 102 through a network interface card (NIC). It should be understood that a driver will allow computer 102 to recognize the hub 110 as being connected to computer 102. In accordance with one embodiment of the invention, the biometric scanning device 112 is embedded in hub 110. As mentioned above, the biometric scanning device 112 could be a fingerprint scanner, an iris scanner, or facial recognition device. In addition, the biometric scanning device 112 may be replaced by a personal identification number (PIN) in another embodiment of the invention. While the biometric scanning device 112 is illustrated as embedded into the hub 110, the biometric scanning device 112 may be a separate stand-alone unit connected to the hub 110. In yet another embodiment, the biometric identifier 112 may be embedded in an external mouse or hamster connected to the hub 110.

The hub 110 of diagram 100 includes a card reader having a slot 114 for insertion of a card 118. The card reader enables communication with the card 118 and the microprocessor of the hub 110 when the card is inserted into the card reader. The card reader may be purchased from Cylink Corp. of Santa Clara Calif. In accordance with one embodiment of the invention, the card 118 is a smart card and includes a microprocessor. Smart cards are commercially available from ST Microelectronics and Atmel Corporation both of San Jose, Calif. The commercially available smart cards include non volatile memory such as an electrically erasable programmable read only memory (EEPROM). In one embodiment of the invention the EEPROM stores the public and/or private keys utilized for unlocking the encryption control device 110. Also included on the smart card 118 is a card microprocessor. In accordance with another embodiment of the invention, the card microprocessor executes the challenge/response protocol for establishing a secure path through the encryption control device 110. In one embodiment, the smart card 118 contains a cryptographic processor which may be part of the card microprocessor or a separate processor on the card. In a preferred embodiment, the card microprocessor or the cryptographic microprocessor executes public-key cryptography such as the Rivest, Shamir and Adleman (RSA) public-key crytposystem. It should be appreciated that other public-key cryptosystems such as Elgamal, Diffie-Hellman, Digital Signature Algorithm (DSA), Secure Hashing Algorithm (SHA) and the like may also be executed by the cryptographic processor. It should be further appreciated that a random number generator and an exponentiation processor are typically included with the commercially available smart cards. In a preferred embodiment, the card will also accommodate a read only memory (ROM) containing a code for communicating with the operating system of the hub 110. The code for the ROM is input by the assignee upon receipt of the cards in one embodiment of the invention. It should be appreciated that the ROM space is only accessible during development. In one embodiment, production units will have the ROM space restricted to protect the functionalities of the card from being compromised.

FIG. 1 also illustrates a hard drive (HD2) 116 connected to the hub 110. HD2 116 stores the encrypted data. Access to the encrypted data contained within HD2 is achieved through the hub 110. For example, when the hub 110 is unlocked after the user has been authenticated and the challenge/response protocol between the card 118 and the hub 110 has been successfully completed, the user gains access to the encrypted data stored on HD2 116. For illustration purposes, HD2 116 is shown separate from the hub 110, however HD2 116 may also be contained within hub 110. In another embodiment of the invention, the encrypted data may be stored on a virtual drive of computer 102. In this embodiment, the encrypted data would be stored physically on HD1 106, however, the virtual drive appears to the system as a separate device which is accessed through the hub 110. The hub 110 is connected to local area network (LAN) 124. Accordingly, encrypted data or electronic mail messages may be sent over a network, such as the Internet, by the user to a remote location. In this embodiment, the recipient of the message must possess the key to decrypt the message upon receipt. For example, the recipient may access a public key to decrypt the message from a public key server or the key may be sent separately to the recipient. Similarly, a remote user may send encrypted data via the LAN 124 to the computer 102 through the hub 110. In this embodiment, the encrypted data is decrypted through an encryption/decryption engine of the hub 110. In other words, the hub 110 intercepts data streams so that encrypted data, whether it is sent from a remote user or retrieved from the system network, is presented as plain text rather than cipher text.

It should be appreciated, that the hub 110 of FIG. 1 may be a generic hub. As the hub 110 and the card 118 both have their respective microprocessors, once the validity of the user to the card and the validity of the card for the hub 110 is established, configuration data from the card 118 is downloaded to the hub. In one embodiment, upon validity establishment, the card passes a secret key to a generic hub, thereby configuring the hub for the owner of the card. A monitor 108 is shown attached to computer 102. A web cam 120 is depicted on top of monitor 108. In one embodiment, the web cam 120 is utilized for facial recognition of a user. In another embodiment, the web cam 120 monitors for the continued presence of a user as a security feature. Hence, if a user should leave the vicinity of the computer 102, software may be included to provide a warning or lockout which requires a password or biometric identifier to re-access the data. Likewise, should the user be perceived to no longer be present, the software may shutdown the encryption control device 110.

In accordance with one embodiment of the invention, the encrypted data may be stored on a server where multiple users have access to the server. With this embodiment, the multiple users may each have a hub 110 connected to their respective office computers. It should be appreciated that since each user has a unique secret key, they will only be allowed to decrypt their respective files. For example, if a first user attempted to open an encrypted file of a second user stored on the server, the first user would be able to open the file, however, the file would not be readable as the first user does not possess the secret key of the second user.

Figure 2:
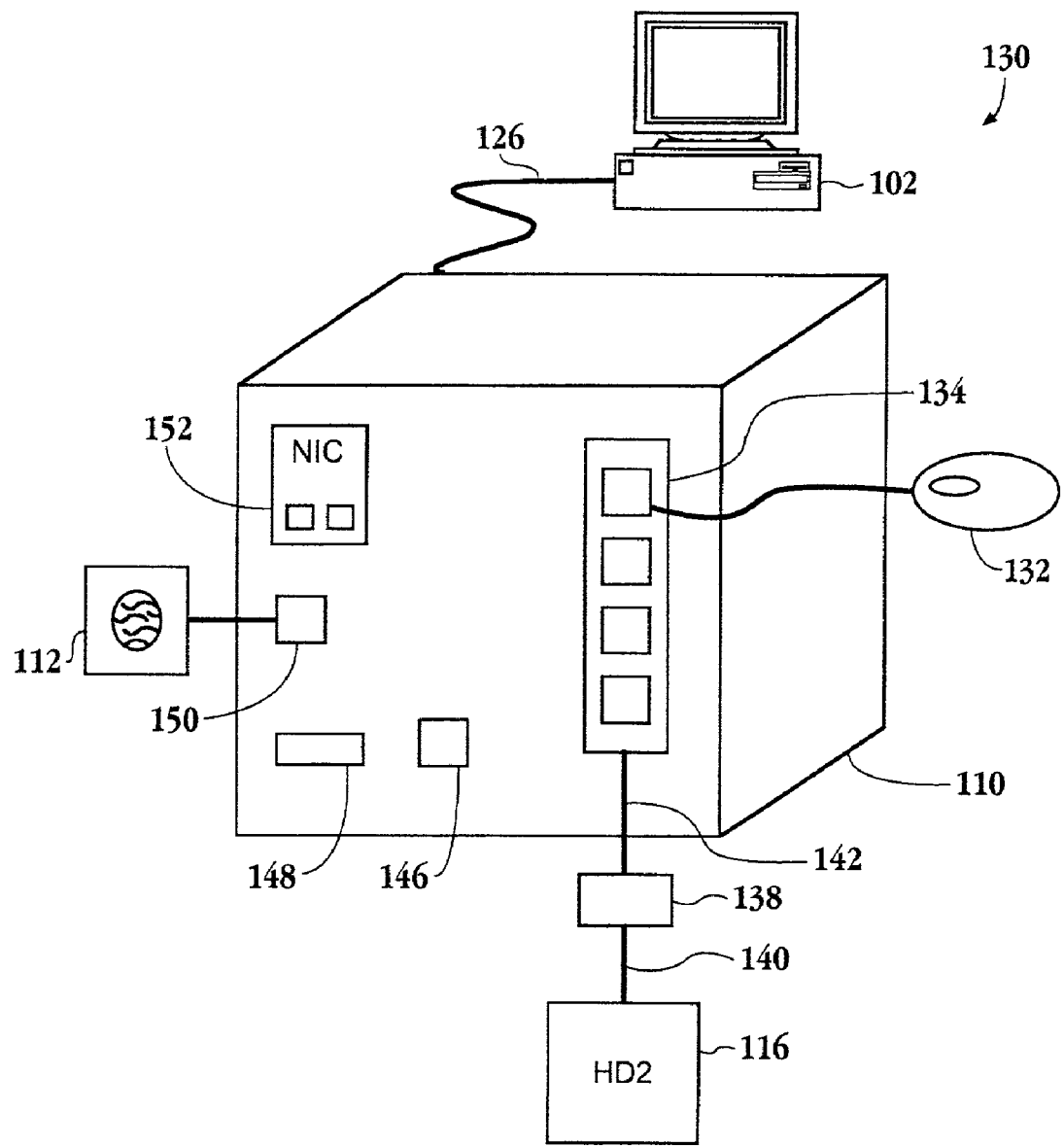
FIG. 2 illustrates a block diagram depicting a detailed hardware configuration of the hub of FIG. 1, in accordance with one embodiment of the invention.

FIG. 2 illustrates block diagram 130 depicting a detailed hardware configuration of the hub 110 of FIG. 1, in accordance with one embodiment of the invention. Computer 102 is connected to hub 110 via USB or FIREWIRE™ interface 126 as described above. Downstream connections include NIC 152 for connecting to a network. Scanner port 150 accepts input from a biometric scanning device 112. For illustration purposes biometric scanning device 112 is shown as a fingerprint scanner, but may include facial recognition, or an iris scanner. It should be appreciated that fingerprint scanner 112 is embedded in hub 110 in accordance with one embodiment of the invention. Small computer system interface (SCSI) interface port 148 and FIREWIRE™ interface port 146 are also provided on hub 110. A plurality of USB ports 134 are included within hub 110.

Continuing with FIG. 2, connected to one of the USB ports 134 is biometric mouse 132 configured to detect a user's fingerprint in accordance with one embodiment of the invention. As mentioned previously, the use of biometric mouse 132 can provide added security in that the system will "lock-up" should a different user manipulate the biometric mouse 132. HD2 116 is connected to one of the USB ports 134. In accordance with one embodiment of the invention, HD2 116 is connected to SCSI/USB converter 138 via SCSI cable 140. USB/SCSI converter 138 is connected to one of the USB ports 134 via USB cable 142. For illustration purposes one hard drive HD2 116 is shown attached to hub 110. Alternatively, a plurality of hard drives may be attached to hub 110. In yet another embodiment, HD2 116 may be attached directly to the FIREWIRE™ interface port 146 or the SCSI interface port 148 with the appropriate cable connection. The hub 110 may also include LED's to indicate secure connections of the attached devices. Additionally, manual switches are provided on the hub 110 to allow a user to bypass the hub in accordance with one embodiment of the invention.

Figure 3:
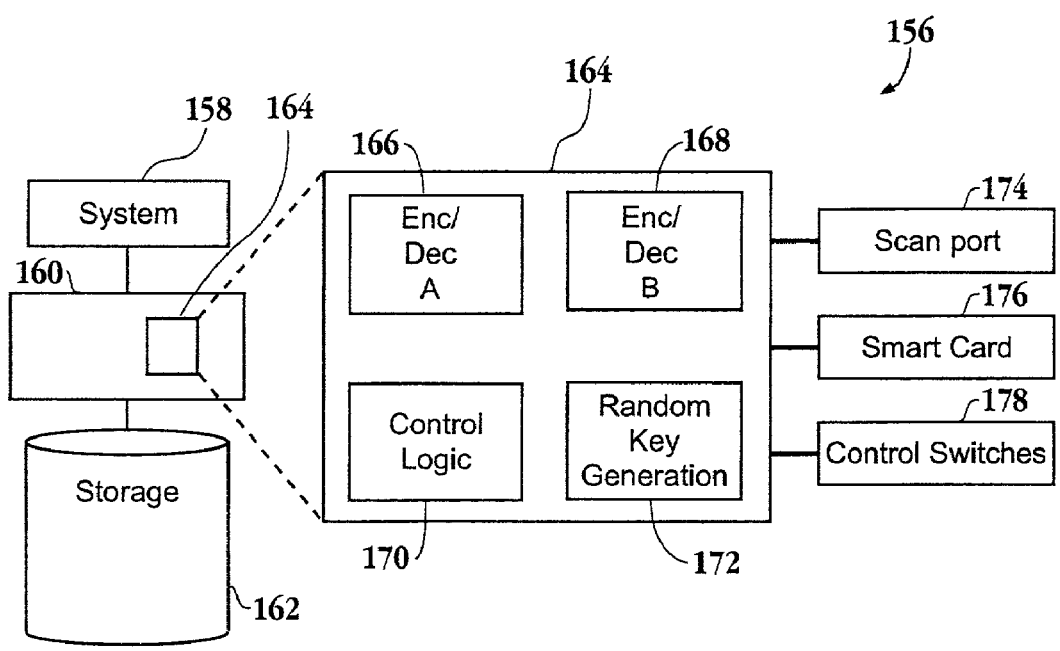
FIG. 3 illustrates a block diagram depicting a more detailed description of the encryption engine of a hub in accordance with one embodiment of the invention.

FIG. 3 illustrates block diagram 156 depicting a more detailed description of the encryption engine of hub 110 in accordance with one embodiment of the invention. Diagram 156 displays encryption control device 160 in between computer system 158 and storage 162. Within encryption control device 160 is microprocessor 164. In accordance with one embodiment of the invention, the microprocessor 164 is a programmable logic device (PLD) such as a field programmable gate array (FPGA). The microprocessor 164 of the encryption control device 160 is enlarged to display regions for encryption/decryption channel A 166, encryption/decryption channel B 168, control logic 170 and random key generation 172. Channel A 166 and Channel B 168 are collectively referred to as the cryptographic engine. In this embodiment, the architecture provides two encryption/decryption channels. Accordingly, if the data path for one channel is busy, then the encryption/decryption process can be performed on the other channel. One skilled in the art understands that the architecture may include one, two or more encryption/decryption channels. It should be appreciated that for the two channel cryptographic engine embodiment, control logic 170 determines which channel is available. Encryption/decryption channels A and B, 166 and 168 respectively, execute the algorithms for encrypting/decrypting the data passing through the encryption control device.

In one embodiment of the invention, the microprocessor 164 only intercepts data. For example, status commands or seek commands generated from the computer system 158 which are destined for storage drive 162, bypass the cryptographic engine. In another embodiment, cyclical redundancy checking is performed in the FPGA environment of the cryptographic engine to ensure the accuracy of transmitting data. A new CRC is then regenerated to reflect the encryption before passing it along unencrypted. Control logic 170 of FIG. 3 includes logic to validate the biometric input of the user in one embodiment. It should be appreciated that control logic 170 may also perform receiving and transmitting functions as well as receive commands from a host. In a preferred embodiment, the cryptographic engine executes public-key cryptography such as the Rivest, Shamir and Adleman (RSA) public-key crytposystem. It should be appreciated that other public-key cryptosystems such as Elgamal, Diffie-Hellman, Digital Signature Algorithm (DSA), Secure Hashing Algorithm (SHA) and the like may also be executed by the cryptographic engine.

In communication with the microprocessor 164 of FIG. 3 is a scan port 174, a smart card 176 and control switches 178. The scan port 174 is connected to a biometric scanning device as illustrated in FIGS. 1 and 2. As mentioned previously, the biometric employed for user authentication may be a fingerprint, iris scan, facial recognition, etc. In one embodiment, a biometric mouse or hamster is connected to the scanning port.

The smart card 176 of FIG. 3 interfaces with the encryption control device 160 through a card reader as illustrated in FIG. 1. As mentioned above, the smart card 176 includes a card microprocessor, EEPROM, ROM for the operating system. A cryptographic processor may be included with the card microprocessor or exist separate from the card microprocessor on the card. In one embodiment, the smart card 176 supports standard International Organization for Standardization (ISO) command functions ensuring interoperability with other smart card readers. The ROM of the smart card 176 includes an operating system code which in one embodiment contains instructions for interfacing with the smart card. In another embodiment the smart card 176 is purchased without the operating system code and the assignee places its proprietary operating system code in the ROM of the smart card 176. For example, the smart cards may include a developer's kit allowing a purchaser of the smart card to input a proprietary operating system code.

Still continuing with FIG. 3, control switches 178 are included. In one embodiment control switches 178 contain logic for locking or unlocking the encryption control device 160. For example, upon initial start-up and authentication the encryption control device 160 is unlocked to allow a user access to encrypted data. Similarly, the encryption control device can be locked should a foreign user attempt to access the encrypted data. As mentioned above, the foreign user may be detected through a number of means, such as fingerprint recognition, facial recognition, iris scan and the like. Additionally, the encryption control device may become locked by a hot key sequence or a valid user logging off. In another embodiment, the control switches 178 are configured to allow the encryption control device 160 to be bypassed. For example, if a user is not working with sensitive data, the user may operate the computer 102 in a mode where the encryption control device 160 is bypassed on one or more ports.

Figure 4:
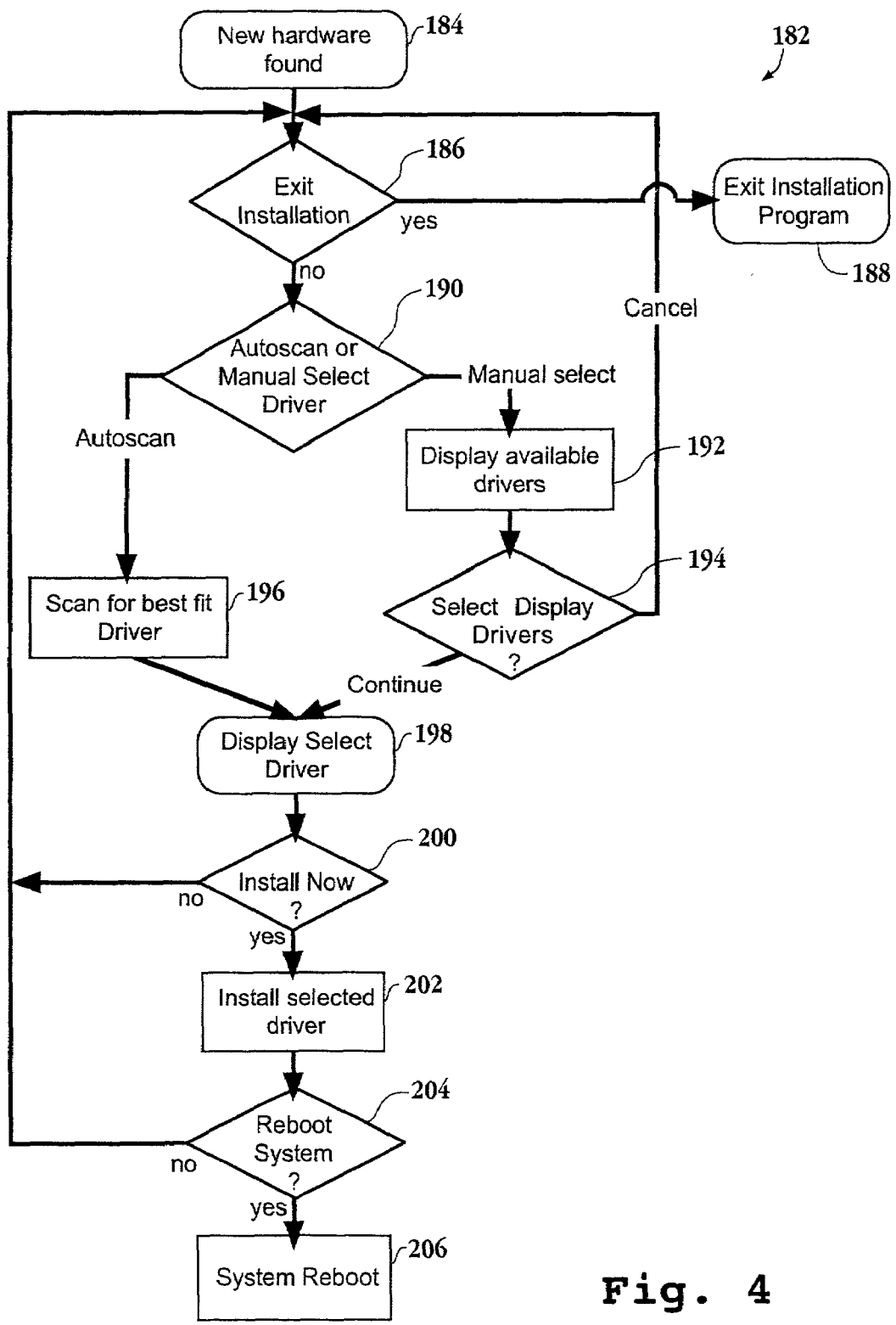
FIG. 4 illustrates a flowchart defining an installation process for initially installing an encryption control device in accordance with one embodiment of the invention.

FIG. 4 illustrates flowchart 182 defining an installation process for initially installing an encryption control device in accordance with one embodiment of the invention. Flowchart 182 initiates with operation 184 where new hardware is found. For example, a user may connect the encryption control device to a personal computer having the appropriate interface, i.e., FIREWIRE or USB interface. In one embodiment, the encryption control device is "hot plugable" so that a bus reset is caused and the computer detects the new hardware. Next, the method proceeds to operation 186 where the user is queried whether they would like to exit the installation. If the user chooses to exit, then the method proceeds to operation 188 where the installation program is exited. Here, normal system operation will resume with the encryption control device acting as a pass through hub.

Should the user decide to go forward with the installation in operation 186 of FIG. 4, the method proceeds to operation 190 where the user is given the option to autoscan or manually select the drivers. If manual selection is chosen, the method advances to operation 192 where the user is presented a display of available drivers. It should be appreciated that the presentation in operation 192 could take the form of a drop down menu containing a list of drivers to choose from. Next, the operation advances to operation 194 where the user is queried as to whether they would like to select the displayed drivers. At this point, the user has the option to cancel the installation and return to operation 186 where the user may exit the installation. Alternatively, the user may continue the installation and proceed to operation 198 where the selected driver is displayed. In another embodiment, the manual select for the driver installation is in the form of a wizard. In yet another embodiment, the user may be prompted by the operating system to install a floppy disk or CD ROM which contains the list of drivers.

Returning back to operation 190 of FIG. 4, if a user decides to utilize the autoscan feature, then the method proceeds to operation 196 where the best fit driver is automatically presented to the user. As a result of the autoscan operation, the system provides the user with the optimum driver based on the hardware detected in operation 184. The method advances to operation 198 where the best fit driver is displayed. Next, the method proceeds to operation 200 where the user is asked to verify that the selected driver of operation 198 to be installed. Here, the user may decide not to install the driver, thereby returning to operation 186 where the user may exit the installation. Alternatively, the user may decide to install the selected driver as illustrated in operation 202. Next, the user is queried whether or not to reboot the system to complete the installation of the new hardware in operation 204. If the user does not desire to reboot the system at this time, then the method advances to operation 186 where the user may exit the installation. In the alternative, the user may complete the installation by electing to reboot the system in operation 204. The system then reboots in operation 206.

Figure 5:
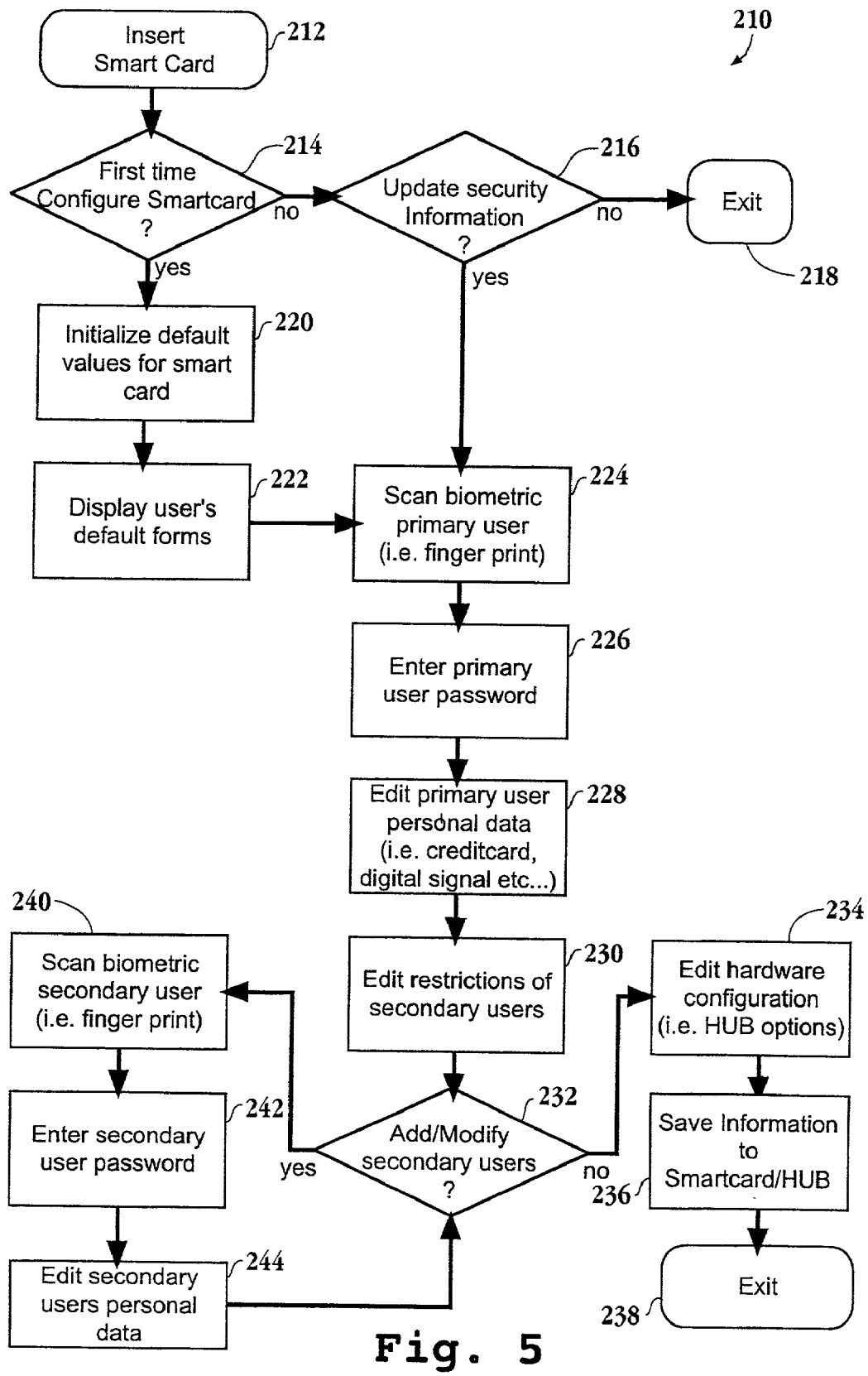
FIG. 5 illustrates a flowchart depicting an encryption control device and smart card configuration process in accordance with one embodiment of the invention.

FIG. 5 illustrates flowchart 210 depicting an encryption control device and smart card configuration process in accordance with one embodiment of the invention. Flowchart 210 initiates with operation 212 where the user inserts a smart card into the card reader of the encryption control device. The card reader may be a stand alone unit connected to the encryption control device or integrally combined with the encryption control device. Moving to operation 214, the user is queried whether this is a first time configuration for the inserted smart card. For the situation where it is the first time configuration, the method proceeds to operation 220 where default values for the smart card are initialized. In one embodiment, the driver reads a smart card hardware configuration register to determine if it is a new installation. In another embodiment, a feature allowing for erasure of previous installation configurations is included. Next, the method advances to operation 222 where the user's default forms are displayed. In one embodiment, the default forms are displayed in a configurable presentation where the user may modify the default settings. The method then advances to operation 224 where a biometric of the user is scanned. As mentioned above, the biometric may include a fingerprint, iris scan, facial recognition and the like.

Returning back to operation 214 of the method, where it is not a first time configuration of a smart card, the method advances to operation 216 where the user is queried to update security information. If the user chooses not to update the security information, the user may exit the encryption control device and smart card configuration process as illustrated by operation 218. If the user decides to update security information, then the method proceeds to operation 224 where a biometric of a primary user is scanned. In one embodiment, the data collected from the biometric scan is appended to the smart card and is not uploaded to the system. Next, a primary user's password or personal identification number (PIN) is entered. For added security, PIN entry can be taken at the hub rather than from the personal computer keyboard. In one embodiment of the invention, a PIN is used in place of a biometric scan. The method then advances to operation 228 where the primary user edits personal data. The personal data includes, credit card numbers, digital signature, social security number, mother's maiden name, place of birth and bank account numbers. Next, the method proceeds to operation 230 where the user edits restrictions of secondary users. Here, secondary users may have limited access to the encrypted data of the primary user. The primary user is enabled to modify the limitations placed on secondary users in one embodiment of the invention.

Continuing with FIG. 5, the method moves to operation 232 where the primary user has the option to add or modify secondary users. If the primary user desires to add or modify secondary users, the method advances to operation 240 where the biometric of a secondary user is scanned. A password or PIN is then entered for the secondary user in operation 242. In one embodiment of the invention, the PIN is used in place of the biometric rather than in tandem with the biometric. Next, the method advances to operation 244 where the secondary user's personal data is edited.

From operation 244 the method of FIG. 5 moves to operation 232 where the primary user is queried as to whether any additional secondary users are to be added or modified. It should be appreciated that operations 232, 240, 242 and 244 may be repeated until all secondary users are modified. Once all of the secondary users are added or modified, the method proceeds from operation 232 to operation 234 where the hardware's configuration is edited. Of course, if no secondary users are to be added then the method also moves from operation 232 to operation 234. In one embodiment, the hardware's configuration includes encryption control device options such as microprocessor serial number, hub serial number, network interface card serial number and media access control address. The method then advances to operation 236 where the information is saved to the smart card and/or the encryption control device. In one embodiment, a driver tests that the hardware is "INIT Unlocked" and sends the configuration package to the smart card. In another embodiment, a security feature is included where once the configuration package is successfully transmitted to the smart card, the configuration package is erased from the system and flushed from the encryption control device. The user exits the configuration process in operation 238. In one embodiment of the invention, once the system is configured and the user's identification initialized the encryption control device is controlled by a system tray application program.

The system tray application program allows the user to control and customize certain device behaviors via a pop up window panel. The following embodiments provide examples of the functionality of the system tray utility application program and are provided for illustrative purposes and not meant to be restrictive. In one embodiment, the system tray utility software includes the ability to select secure ports similar to manual switches on the encryption control device. In another embodiment, the software includes default settings of the secure port selection, and supports remote shutdown or locking of the device upon a certain hot key sequence. It should be appreciated that remote shutdown may be initiated if certain activity, such as key strokes or mouse clicks are not detected over a selected time period. Additionally, the remote shutdown may be temporarily customized to allow a continuous long transfer initiated by a user who subsequently leaves for an extended time. In yet another embodiment, the software may include the functionality to wake up the system and supply the system password, from the smart card, upon the user's return and successful unlock of the encryption control device. It should be appreciated that other application's requests for remote shutdown security may be supported by the system tray such as a silent web site informant, firewall alarm, configuration changes, facial recognition, etc. In still another embodiment, the software includes logging the time of day, a web cam clip or other pertinent information regarding unauthorized attempts to wake up the system with the wrong biometric or PIN. In another embodiment, the software includes a lockout feature allowing the user to select how many unsuccessful attempts are made against the smart card before erasure occurs. In yet another embodiment, the software includes a warning feature if the user leaves the area while the smart cards are inserted in the card reader, such as a pop up window upon the return of the user.

Further specialized software features may be included in additional embodiments. For example, one such feature is an application allowing for copying non-encrypted data from a system's hard drive through the encryption control device and storing the data in encrypted format back to the system drive. It should be appreciated this feature is advantageous for an initial installation where the user desires to convert stored data to an encrypted format. In one embodiment, an encrypted virtual drive utility allowing for drag and drop file copying is included. In another embodiment, the specialized software forces the application software to receive and return files to the encrypted disk. Additionally, the software generates warnings if a user exposes what was encrypted data to the system in a non-encrypted format. In yet another embodiment, the software provides for secure transfer of ownership of encrypted system data.

Additional security features include periodically challenging the smart card to ensure its actual presence and detecting the connection to the host computer. In another embodiment, a change in the device's system identification will indicate that another device was hot plugged between it and the host computer. Internal device serialization is included in yet another embodiment. Additionally, the software may be capable of providing warning and ultimately shutting down the encryption control device if a user is no longer detected as present. A user's presence is detected by a software timeout of the keystrokes on the keyboard in one embodiment. In another embodiment, the loss of biometric mouse or hamster feedback, loss of facial feedback or loss of power indicate the lack of a user's presence. In yet another embodiment, an alarm condition from a firewall, system configuration changes or a hot key sequence initiated by an operator cause the encryption control device to shutdown or lock-up.

The encryption control device (ECD) includes alarm/lockout type functions that include a sudden loss of power without a proper shutdown sequence and failure to respond to or incorrect responses to system challenges in one embodiment of the invention. In another embodiment, the alarm/lockout functions include attachment of the ECD to a computer whose name is not listed under the user's frequently used systems, which is stored in the smart card. In yet another embodiment, attachment to a system where the media access control (MAC) address is unlisted or a system where the processor's serial number does not match.

The consequences for the alarm/lockout functions include silent transmission of the devices serial number along with the connecting IP address and other pertinent system information such as user name, computer name and electronic mail address to a secure web site in one embodiment. In another embodiment, an audit trail of all systems to which the device is attached is another consequence of triggering the alarm/lockout functions.

Figure 6:
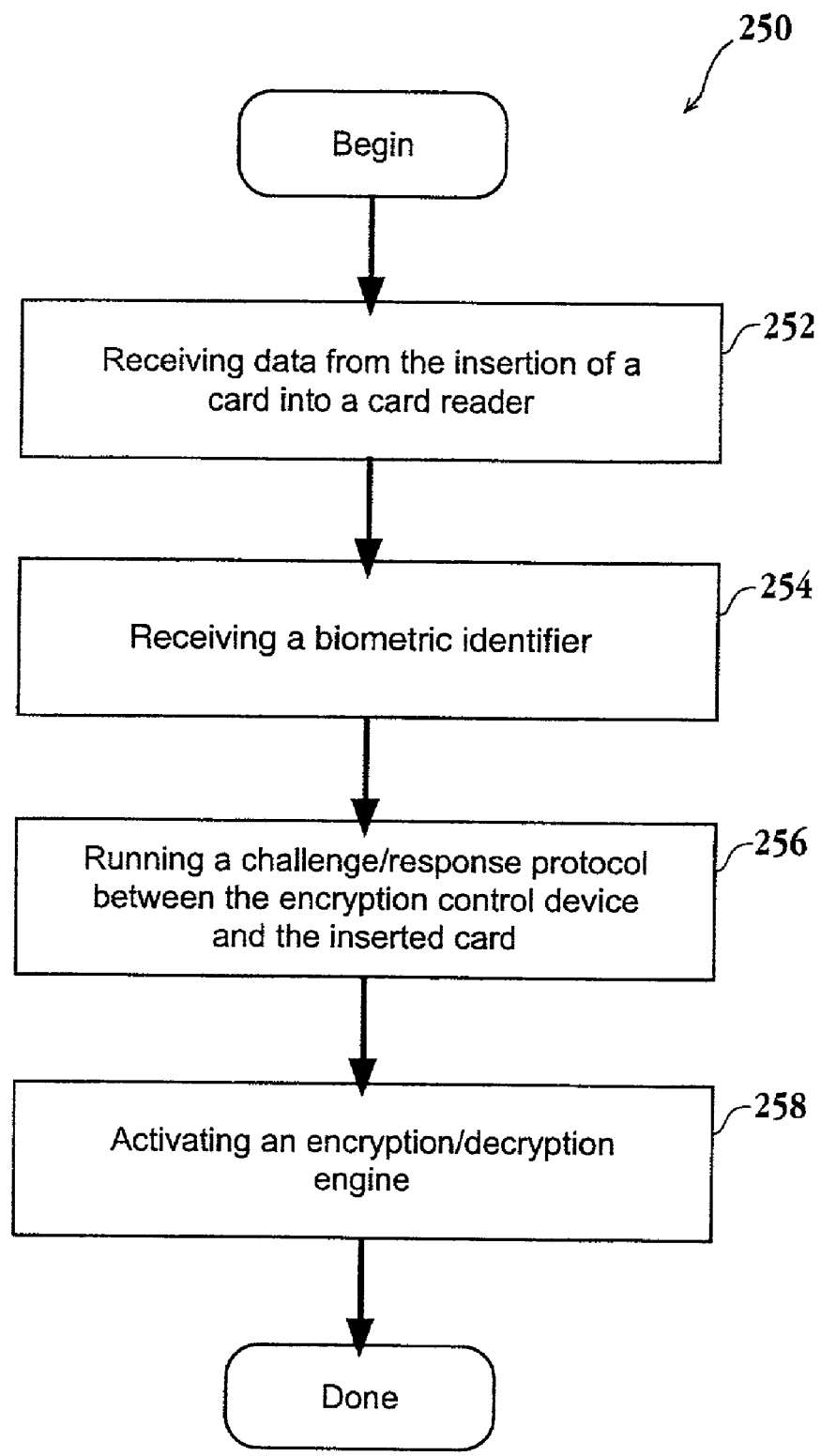
FIG. 6 illustrates a flowchart displaying a method for activating an encryption control device that provides a secure computing environment for a user in accordance with one embodiment of the invention.

FIG. 6 illustrates flowchart 250 displaying a method for activating an encryption control device that provides a secure computing environment for a user in accordance with one embodiment of the invention. Flowchart 250 initializes with operation 252 where data is received from insertion of a card into a card reader. The card is a smart card containing a microprocessor in one embodiment. As mentioned above, the card reader is integral with the encryption control device in a preferred embodiment. In another embodiment the data allows for configuration or initialization of the encryption control device. Next, the method proceeds to operation 254 where a biometric identifier is received. As discussed previously, the biometric identifier may include a fingerprint, iris scan, facial recognition and the like. In a preferred embodiment, the data collected from the biometric scan is appended to the encryption control device itself and not uploaded to the user's computer system. The biometric identifier authenticates the user as an authorized user of the card in one embodiment.

Flowchart 250 then proceeds to operation 256 where a challenge/response protocol is executed between the encryption control device and the inserted card. The challenge/response protocol includes the exchange of public and private keys to unlock the encryption control device in one embodiment. The challenge/response protocol is described in more detail in reference to FIG. 8. In operation 258, the encryption/decryption engine is activated once the user is authenticated and the challenge/response protocol is successfully completed in one embodiment. Once activated, the transfer, creation, copying of encrypted/decrypted digital data is allowed as long as the user is perceived to be present in another embodiment.

Figure 7:
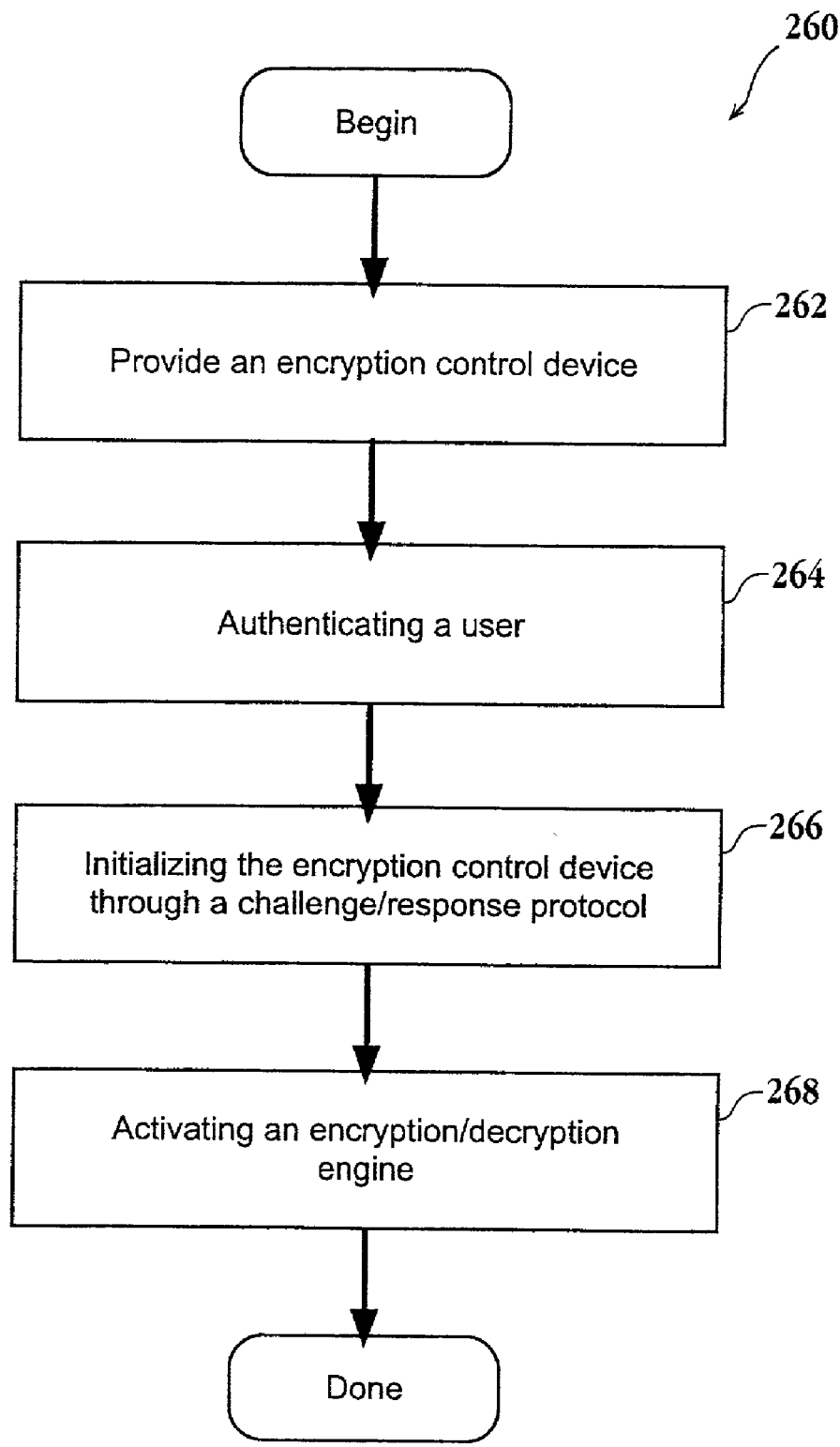
FIG. 7 illustrates a flowchart displaying a method for providing a secure computing environment in accordance with one embodiment of the invention.

FIG. 7 illustrates flowchart 260 displaying a method for providing a secure computing environment in accordance with one embodiment of the invention. Flowchart 260 initiates with operation 262 where an encryption control device is provided. Here, the encryption control device is the hub as described in FIGS. 1–3 in one embodiment of the invention. Next, a user is authenticated in operation 264. The user is authenticated by linking the user with a smart card inserted into the encryption control device in one embodiment of the invention. The user may provide a biometric identifier to establish the user as an authorized user. In one embodiment of the invention the biometric identifier is compared with a stored copy of the biometric identifier contained on the smart card and/or the encryption control device. If the stored copy and the supplied biometric identifier are a match, then the method proceeds to operation 266.

Flowchart 260 then advances to operation 266 after the user has been authenticated in operation 264. It should be appreciated that if the provided biometric identifier does not match the stored copy, then the user will be denied further access. Operation 266 executes a challenge/response protocol, which upon its successful completion, initializes the encryption control device. The challenge/response protocol is described in more detail in reference to FIG. 8. Once the encryption control device has been initialized in operation 266, an encryption/decryption engine is activated in operation 268. As described above the encryption/decryption engine consists of multiple channels in accordance with one embodiment of the invention. It should be appreciated that once the encryption/decryption engine is activated, a user may access the secure data.

Figure 8:
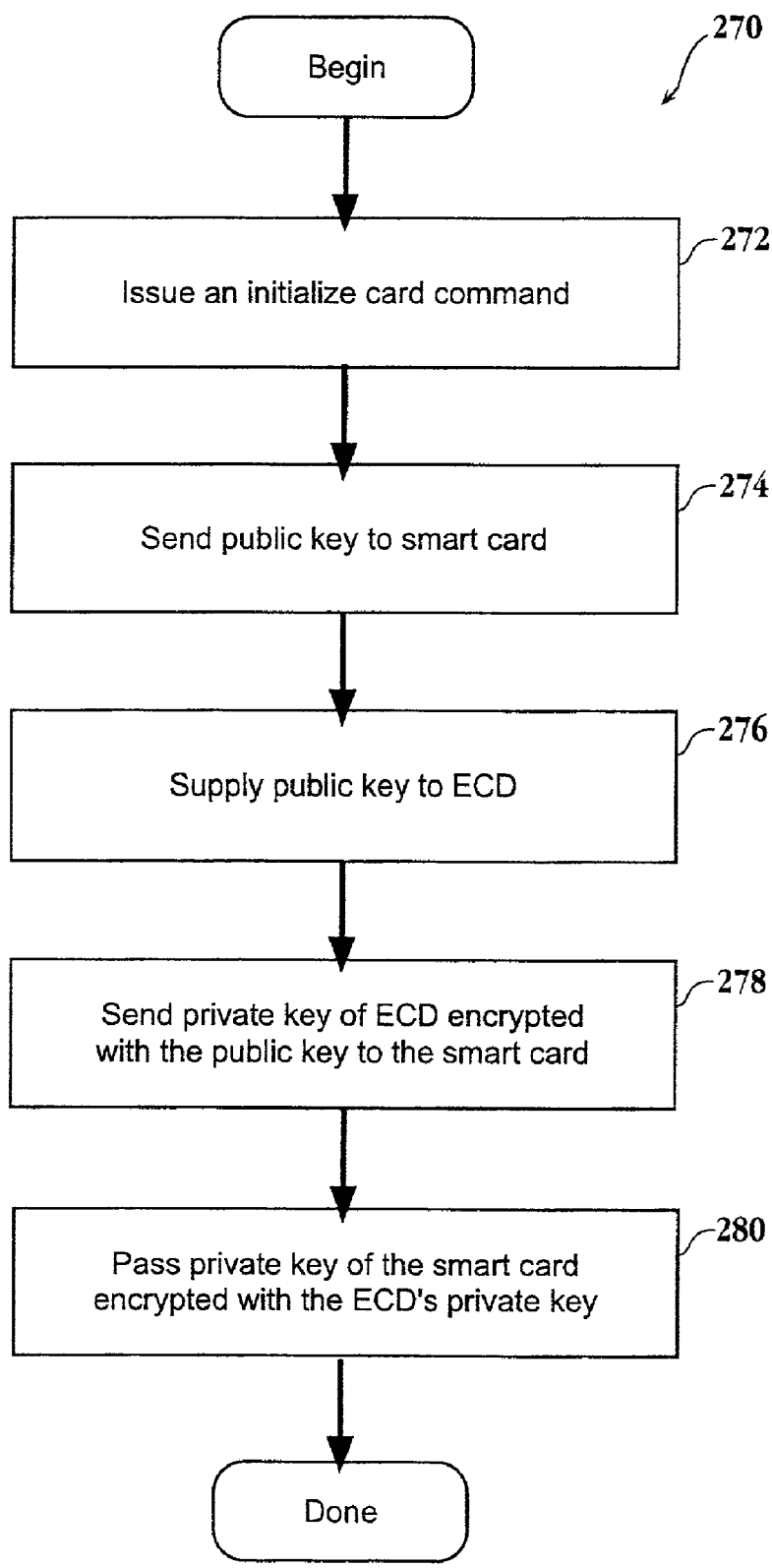
FIG. 8 illustrates a flowchart displaying a more detailed description of the challenge/response protocol in accordance with one embodiment of the invention.

FIG. 8 illustrates flowchart 270 displaying a more detailed description of the challenge/response protocol in accordance with one embodiment of the invention. Flowchart 270 initiates with operation 272 where an initialize card command is issued by the encryption control device. Here, the card is initialized as described in reference to FIG. 5. It should be appreciated that the user first inserts a smart card provided with the system to initiate operation 272. Next, the method advances to operation 274 where the encryption control device (ECD) sends a public key through the card reader to the smart card. Then, in operation 276 the smart card supplies a public key to the ECD. In operation 278, the ECD sends its private key encrypted with the public key to the smart card in response to the completion of operation 276. In turn, once operation 278 has been completed, the smart card passes its private key to the ECD. In a preferred embodiment the private key of the smart card is encrypted with the ECD's private key.

It should be appreciated that the above challenge/response protocol allows for the secure exchange of the public and private keys in order to establish a secure path between the ECD and the smart card. The secure path allows for the memory of the smart card to be written with the configuration and biometric data from the ECD under command of a device driver. In one embodiment, the encryption control unlocks the data path to the smart card and signals its readiness through the INIT Unlock bit in the status register to indicate the smart card is ready to be written. In another embodiment of the invention, a software driver downloads and verifies the configuration contents of the smart card. Here, the ECD under direction of the driver can append or store the biometric data to the smart card. It should be appreciated that once the challenge/response protocol is completed, the user may unlock the ECD in the future by supplying a biometric identifier. Once the biometric identifier is matched with the stored copy of the smart card the user can access the secure environment in one embodiment. In this embodiment, the normal use and control of the ECD is enabled via a user's tray utility. In addition, there may be other software utilities that will allow for the storage on the smart card for personal data such as account information, passwords and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing a secure computing environment, comprising:
   providing a portable encryption control device;
   attaching the portable encryption control device to a computing device;
   triggering a bus reset on the computer in response to attaching the portable encryption control device;
   enabling a user to control and customize the portable encryption control device features through a system tray utility program;
   authenticating the user as a valid owner of a smart card;
   initializing the encryption control device through a challenge/response protocol with the smart card if the valid owner is authenticated;
   activating an encryption/decryption engine of the encryption control device to enable access to data in a secure computing environment if the challenge response protocol is executed successfully;
   enabling the user to add a secondary user to the smart card; and
   setting the secondary user's level of access to the portable encryption control device.

2. The method as recited in claim 1, wherein the authenticating the user as a valid owner of the smart card includes providing a personal identification number.

3. The method as recited in claim 1, wherein the authenticating the user as a valid owner of the smart card includes providing a biometric identifier.

4. The method as recited in claim 1, wherein the challenge/response protocol includes an exchange of private and public keys between the encryption control device and a smart card.

5. The method as recited in claim 1, wherein a biometric scanner is employed for authenticating a user.

6. The method as recited in claim 1, further including, monitoring for continued presence of the valid owner; and locking the encryption control device if the valid owner is not detected.

7. The method as recited in claim 1, wherein the smart card stores the user's personal data.

8. The method as recited in claim 1, wherein a personal identification number is used to authenticate a user.

9. The method as recited in claim 1, further including, providing control switches for bypassing the encryption control device.

10. The method as recited in claim 1, wherein enabling a user to control and customize the portable encryption control device features through a system tray utility program includes,
    tracking unauthorized attempts made to access the portable encryption control device, and
    allowing for a remote shutdown of the portable encryption control device.

11. A method for activating an encryption control device that is in communication with a computer for providing a secure computing environment for a user, comprising:
    providing a card for insertion into a card reader of the portable encryption control device, the card being configured to receive and pass data;
    attaching the portable encryption device to the computer;
    triggering a bus reset on the computer in response to attaching the portable encryption control device;
    enabling a user to control and customize the portable encryption control device features through a system tray utility program, the enabling including,
        tracking unauthorized attempts made to access the portable encryption control device, and
        allowing for remote shutdown of the portable encryption control device;
    receiving a biometric identifier from the user, the biometric identifier enabling validation of the user as the authorized owner of the card;
    running a challenge/response protocol between the encryption control device and the inserted card, the challenge/response protocol establishing that the inserted card and the encryption control device are compatible; and
    activating an encryption/decryption engine of the encryption control device to create a secure computing environment if the user is validated as the authorized owner of the card and challenge response protocol is successfully executed;
    enabling the user to add a secondary user to the smart card; and
    setting the secondary user's level of access to the portable encryption control device.

12. The method as recited in claim 10, wherein the encryption engine executes RSA public-key cryptosystem.

13. The method as recited in claim 11, wherein the data are public and private keys.

14. The method as recited in claim 11, wherein execution of the challenge/response protocol establishes a secure path between the encryption control device and the inserted card, the secure path allowing for configuration and biometric data from the encryption control device to be transferred to the inserted card and allowing data from the inserted card to be downloaded to the encryption control device.

15. A method for operating a computer in a secure mode, comprising:
    attaching a portable encryption control device (ECD) to the computer;

triggering a bus reset on the computer in response to attaching the portable encryption control device;
enabling a user to control and customize the portable encryption control device features through a system tray utility program;
authenticating the user as a valid owner of the smart card, the authenticating further including,
  receiving a biometric identifier from the user, and
  comparing the received biometric indicator with the stored biometric indicator for a match;
  activating an encryption/decryption engine of the encryption control device to create a secure operating mode if the user is authenticated;
enabling the user to add a secondary user to the smart card upon authentication; and
setting the secondary user's level of access to the portable encryption control device.

16. The method as recited in claim 15, wherein the ECD includes a storage medium for storing encrypted data.

17. The method as recited in claim 15, wherein encrypted data is stored on a virtual drive of the computer.

18. The method as recited in claim 15, further including;
  allowing the user to transfer unencrypted data from a non-secure storage drive to a secure storage drive, the secure storage drive storing data in an encrypted format.

19. The method as recited in claim 15, wherein enabling a user to control and customize the portable encryption control device features through a system tray utility program includes,
  tracking unauthorized attempts made to access the portable encryption control device, and
  allowing for a remote shutdown of the portable encryption control device.

* * * * *